United States Patent [19]

Muto

[11] Patent Number: 4,624,397
[45] Date of Patent: Nov. 25, 1986

[54] HYDRANT COUPLER VALVE BRACKET

[76] Inventor: Gary Muto, 35811 Augustine Pl., Fremont, Calif. 94536

[21] Appl. No.: 752,604

[22] Filed: Jul. 8, 1985

[51] Int. Cl.$^4$ .............................................. B60R 9/00
[52] U.S. Cl. ............................. 224/42.45 R; 224/273
[58] Field of Search ............... 224/42.45 R, 324, 273, 224/326; 248/240, 282; 211/70.6

[56] References Cited

U.S. PATENT DOCUMENTS

| | | | |
|---|---|---|---|
| 4,006,852 | 2/1977 | Pilsner et al. | 224/42.45 R X |
| 4,085,961 | 4/1978 | Brown | 248/282 X |
| 4,219,141 | 8/1980 | Lovy | 224/273 |
| 4,381,069 | 4/1983 | Kreck | 224/42.45 R X |

*Primary Examiner*—Stephen Marcus
*Assistant Examiner*—Robert Petrik
*Attorney, Agent, or Firm*—Bielen and Peterson

[57] ABSTRACT

A fold-back support bracket mountable on the back of a fire truck for storage of an automatic flow valve for a fire hose, the bracket having a vertically oriented mounting plate connected to an articulating wing unit having a support plate hingedly coupled to the mounting plate and a pair of parallel guide plates attached perpendicularly to the support plate, the guide plates forming a rack with a horizontal guide slot into which the flow valve is inserted for storage, the valve being locked in place by a first pin and the wing unit being locked in place by a second pin, the wing unit folding back against the mounting plate when the valve and pins are withdrawn to provide improved access to the fire hose stored above the valve bracket.

8 Claims, 4 Drawing Figures

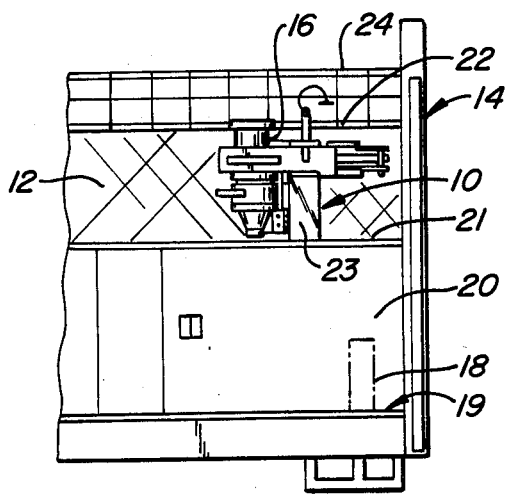
FIG.—1.
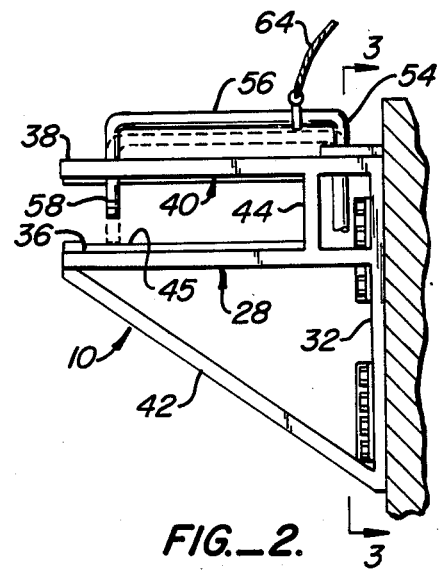
FIG.—2.
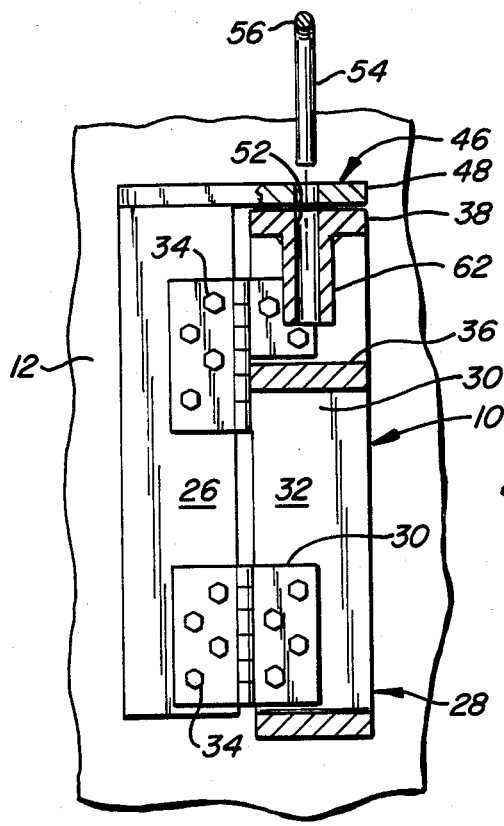
FIG.—3.
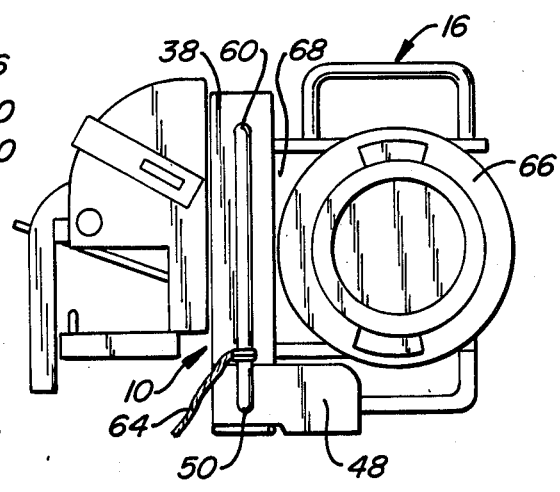
FIG.—4.

HYDRANT COUPLER VALVE BRACKET

BACKGROUND OF THE INVENTION

This invention related to a bracket device for convenient storage of an automatic flow valve for a fire hose. The bracket is a fold-back support bracket particularly adapted to be mounted on the back of a fire truck for storage and transport of an automatic flow valve for example a valve known as a Carlin valve which interconnects to a fire hydrant and a supply hose to a pump truck. Since the valve must be quickly removed from the pump truck and installed immediately on a hydrant at the fire scene as a first step in water supply operations, the valve must be readily accessible and easily removed from storage on the truck. In past arrangements the valve has been installed in a bracket mounted on the sill step of the rear bumper of the pump truck. This location prevents ready access to the rear storage cabinets. Storing the valve in the storage cabinets inhibits quick location and retrieval, particularly when stored with other equipment.

It is desired that the valve be located where it is visible and readily accessible for unimpeded removal for quick installation. In furtherance of this objective the valve bracket of this invention was devised. The valve bracket permits the valve to be stored without blocking access to equipment compartments and includes a fold-back feature to articulate a projecting rack portion of the valve out of potential interference with operations once the valve has been removed.

SUMMARY OF THE INVENTION

The bracket device of the invention comprises a fold-back support bracket for storage of a Carlin type valve, the bracket having a mounting plate, adapted to mounting the bracket to a vertical surface, and a wing unit, hingedly connected to the mounting plate. The wing unit has a locking mechanism for both locking the wing unit in place when the valve is installed and locking the valve into the wing unit to prevent inadvertent dislodgement.

While the valve bracket may have utility in storing a Carlin-type automatic valve in a shop or fire house, its primary utility is to conveniently mount the valve to a fire truck for ready access and quick removal. Since a Carlin valve is installed on a fire hydrant to control the supply of water to the pump truck, removal of the valve from the truck and installation of the valve on the hydrant are virtually the first tasks that must be performed once the fire engine arrives on the scene of a fire. For convenience, the valve bracket is mounted on the back of the pump truck proximate the fire hose. The bracket's mounting plate is bolted or welded to the vertical diamond plate panel common to the back of most pump trucks located below the hose compartment or trough and above the equipment cabinets. Hinged to the mounting plate is a wing unit which includes a support rack for the valve and a combination locking mechanism to lock the valve into the support rack and lock the wing unit in a position perpendicular to the mounting plate. When the valve is removed from the rack the wing unit folds against the mounting plate eliminating any interference with removal of the fire hose stored in the compartment above the rack mounting. Folding of the wing unit against the mounting plate is automatically accomplished by a spring biased hinge connecting the wing unit to the mounting plate. The wing unit is naturally biased to the folded position necessitating the wing unit to be folded out and locked in place before receiving the valve. These and other features will become apparent on considering the preferred embodiment disclosed in the detailed description hereafter.

BRIEF DESCRIPTION OF THE DRAWINGS

FIG. 1 is a schematic view of the valve bracket and valve mounted on the rear of a fire truck.

FIG. 2 is a side elevational view of the valve bracket.

FIG. 3 is a cross sectional view taken on the lines 3—3 in FIG. 2.

FIG. 4 is a top view of the valve bracket and installed valve.

DETAILED DESCRIPTION OF THE PREFERRED EMBODIMENTS

Referring to FIG. 1, the bracket device, designated generally by the reference numeral 10, is shown mounted on the upper diamond plate panel 12 on the back of a fire truck 14. Installed in the bracket device is a Carlin automatic flow valve 16 utilized in connecting a pump truck to a fire hydrant. The bulk of the Carlin valve makes it inconvenient to store, and a convential placement of a fixed rack 18, shown schematically in phantom in FIG. 1. on the rear step bumper 19 of the fire truck 14 blocks access to storage cabinets 20. The bracket device 10 is located on the upper diamond plate panel 12 above the upper shelf step 21 and below the hose compartment or trough 22. In this location the Carlin valve 16 is readily accessible for quick removal and installation on a hydrant upon arrival of the pump truck on the fire scene.

The bracket device 10 articulates to allow a projecting portion to fold back against the panel 12 when the valve is removed. In this manner, access to the hose 24 stored in the hose compartment 22 is not impeded. The bracket device is preferably fabricated from aluminum bar stock, but may be fabricated from steel or other similar materials.

Referring to FIG. 2-4 the bracket device 10 is constructed with a vertically oriented flat mounting plate 26 which is bolted or welded to the diamond plate panel 12 of the fire truck 14. The mounting plate 26 is connected to a wing unit 28 by two hinges 30 which allows the aforementioned articulation and when the flow valve is removed. To bias the wing unit such that it lies flat against the panel 12 when the valve is removed, at least one of the hinges is of a spring closure type. In this manner interference of the bracket device with the hose compartment 22 is minimized.

The wing unit 28, as shown in FIGS. 2-4, is constructed with a support plate 32 in paralled juxtaposition to the mounting plate 26 and provides the connection base for the hinges 30 which are fastened by bolts 34 threaded to tapped holes in the respective plates.

At the top of the support plate 32 are two spaced, flat horizontally disposed plates 36 and 38 perpendicularly joined to the support plate to form a slide rack for a constricted neck portion of the valve. The lower plate 36 has a diagonal brace 42 interconnecting its end with the bottom of the support plate 32 for added strength. A stop plate 44 joined between the top and bottom plates adds additional strength while functioning as a stop for displacing the flow valve away from the truck panel 12. The flat elongated plates are disposed in parallel planes to define a pair of tines with Delrin ™ liners 45 between which the valve easily slides.

To prevent free articulation of the wing unit 28 a locking mechanism 46 comprising an extension plate 48 or tab perpendicularly joined to the top of the mounting plate and extending over a portion of the upper rack plate 38. The extension plate includes a hole 50 which aligns with a hole 52 in the upper rack plate when the wing unit is perpendicular to the mounting plate 26. When a pin 54 is inserted into the two holes 50 and 52, the position of the wing unit is fixed with respect to the mounting plate. The pin 54 is at one end of the bent rod 56 which includes a second pin 58 that simultaneously engages a second hole 60 on the upper rack plate such that the pin forms a second stop in the guide slot between the two rack plates preventing the inserted valve from being removed without extraction of the pin. The wing unit locking hole 52 has a contiguous sleeve 62 to improve the seating of the pin and reduce undesirable play of the wing unit. While the dual locking features can be accomplished with separate pins, the bent rod 56 is convenient to handle and requires a single tether 64 connected to the panel 12 to prevent inadvertent loss. It is preferred that the segment of the bent rod 56 forming the wing unit locking pin 34 be longer than the segment forming the valve locking pin 58 allowing the wing unit pin 54 to be engaged prior to insertion of the valve pin 64.

When mounted in the rack 40 as shown in FIG. 4 the valve 16 has its conduit portion 66 and its trigger mechanism portion 68 on opposite sides of the wing unit. The rack plates engage a flat intermediate portion 70 of the valve and stably supports the valve in place. With the locking mechanism installed, the valve is securely retained until needed.

While in the foregoing embodiments of the present invention have been set forth in considerable detail for the purposes of making a complete disclosure of the invention, it may be apparent to those of skill in the art that numerous changes may be made in such detail without departing from the spirit and principles of the invention.

What is claimed is:

1. A mounting rack for a Carlin valve or the like, the mounting rack being constructed and arranged for mounting to a vertical surface such as a back panel of a fire truck comprising:
   a mounting member adapted for fixed connection to a vertical surface;
   a vertically oriented support member connected to the mounting member and having means for articulating the support member about a vertical axis with respect to said mounting member;
   first and second parallel, spaced elongated guide members projecting from the support member and horizontally disposed for unitary articulation with the support member, the guide members being adapted to receive a neck portion of the Carlin valve between the two guide members;
   first locking means for selectively engaging and locking the support member relative to the mounting member with the parallel spaced guide members positioned perpendicular to the vertical surface; and
   second locking means for retaining the Carlin valve in the mounting rack when the support member is locked relative to the mounting member, wherein said first and second locking means are part of a unitary structure having a hand grip section enabling concurrent release of said first and second locking means.

2. The mounting rack of claim 1 wherein the mounting member and support member comprise flat plates, the support member being connected to the mounting member by at least one hinge unit.

3. The mounting rack of claim 2 wherein the hinge unit integrally includes the spring bias means for biasing the spaced guide members against the mounting member when the first locking means is disengaged and the Carlin valve removed.

4. The mounting rack of claim 1 wherein said first and second guide members comprise upper and lower, flat plates forming tines between which the valve is supported.

5. The mounting rack of claim 4 wherein the second locking means comprises a pin member which engages the upper flat plate and downwardly extends to the space between the upper and lower plate blocking removal of an in-place valve.

6. The mounting rack of claim 4 wherein the first locking means comprises a fixed tab on the mounting member which is positioed in juxtaposition to the upper flat plate when the guide members are perpendicular to the vertical surface, said tab and said mounting member each having a hole, said holes being coincident in such position, the locking means including a pin member inserted into said coincident holes to interlock the guide member and the support member.

7. The mounting rack of claim 6 wherein the second locking means comprises a second pin member which engages the upper flat plate and downwardly extends to the space between the upper and lower plate blocking removal of an in-place valve.

8. A mounting rack for a Carlin valve or the like, the mounting rack being constructed and arranged for mounting to a vertical surface such as a back panel of a fire truck comprising:
   a mounting member adapted for fixed connection to a vertical surface;
   a vertically oriented support member connected to the mounting member and having means for articulating the support member about a vertical axis with respect to said mounting member;
   first and second parallel, spaced elongated guide members projecting from the support member and horizontally disposed for unitary articulation with the support member, the guide members being adapted to receive a neck portion of the Carlin valve between the two guide members;
   first locking means for selectively engaging and locking the support member relative to the mounting member with the parallel spaced guide members positioned perpendicular to the veritcal surface; and
   second locking means for retaining the Carlin valve in the mounting rack when the support member is locked relative to the mounting member; and,
   spring bias means operably connected to said mounting member and said support member for articulating the support member against the mounting member such that the elongated guide members projecting from the support member fold against the vertical mounting surface when the locking means are disengaged and the Carlin valve removed.

* * * * *